US008387360B2

(12) United States Patent
Kinsey et al.

(10) Patent No.: US 8,387,360 B2
(45) Date of Patent: Mar. 5, 2013

(54) INTEGRAL THRUST VECTOR AND ROLL CONTROL SYSTEM

(75) Inventors: Lloyd E. Kinsey, Tucson, AZ (US); Robert J. Cavalleri, Coral Springs, FL (US)

(73) Assignee: Raytheon Company, Waltham, MA (US)

( * ) Notice: Subject to any disclaimer, the term of this patent is extended or adjusted under 35 U.S.C. 154(b) by 960 days.

(21) Appl. No.: 12/468,190

(22) Filed: May 19, 2009
(Under 37 CFR 1.47)

(65) Prior Publication Data

US 2009/0288389 A1 Nov. 26, 2009

Related U.S. Application Data

(60) Provisional application No. 61/055,136, filed on May 21, 2008.

(51) Int. Cl.
*F02K 1/00* (2006.01)

(52) U.S. Cl. .......................... 60/229; 244/3.22

(58) Field of Classification Search ............ 60/228–230; 239/265.19, 265.23, 265.31; 244/3.1–3.3
See application file for complete search history.

(56) References Cited

U.S. PATENT DOCUMENTS

| | | | |
|---|---|---|---|
| 1,879,187 A | 9/1932 | Goddard | |
| 3,020,714 A | 2/1962 | Eggers et al. | |
| 3,096,049 A * | 7/1963 | Karasinski | 244/52 |
| 3,414,217 A * | 12/1968 | Kesting | 244/3.23 |
| 3,635,404 A * | 1/1972 | Hopkins et al. | 239/265.15 |
| 3,743,184 A * | 7/1973 | Mancus | 239/265.19 |
| 4,143,837 A * | 3/1979 | Thunholm | 244/3.22 |
| 4,194,706 A * | 3/1980 | Detalle | 244/3.23 |
| 4,274,610 A | 6/1981 | Bastian | |
| 4,478,040 A * | 10/1984 | Johnson | 60/225 |
| 5,125,596 A | 6/1992 | Cavalleri | |
| 5,511,745 A * | 4/1996 | Faupell et al. | 244/3.22 |
| 5,806,791 A * | 9/1998 | Hatalsky et al. | 244/3.24 |
| 6,450,443 B1 * | 9/2002 | Kim | 244/3.23 |
| 6,681,560 B2 | 1/2004 | Friedlander, III et al. | |
| 7,434,762 B2 | 10/2008 | Hatalsky et al. | |
| 2008/0179449 A1 * | 7/2008 | Hatalsky et al. | 244/3.21 |

FOREIGN PATENT DOCUMENTS

| | | |
|---|---|---|
| JP | 10-238409 | 9/1998 |
| WO | WO 00/02003 | 1/2000 |

OTHER PUBLICATIONS

Cavalleri et al., Experimental and Theoretical Compression of the Probe Thrust Vector Control Concept, AIAA/SAE/ASME/ASEE 27th Joint Propulsion Conference, Jun. 24-26, 1991, pp. 1-10.
European Patent Office, International Search Report and Written Opinion for International Application No. PCT/US2009/044439, mail date Mar. 12, 2010, 14 pages.

* cited by examiner

*Primary Examiner* — Phutthiwat Wongwian
(74) *Attorney, Agent, or Firm* — Renner, Otto, Boiselle & Sklar, LLP (57) ABSTRACT

An apparatus for vectoring the thrust of a motor that produces thrust along a longitudinal axis by expelling combustion gases through a nozzle may include a plurality of linearly-positionable non-rotatable thrust deflectors. The thrust deflectors may be disposed at around a perimeter of the nozzle. Each thrust deflector may be independently extended to simultaneously generate both a force transverse to the longitudinal axis and a torque about the longitudinal axis.

19 Claims, 9 Drawing Sheets

INTEGRAL THRUST VECTOR AND ROLL CONTROL SYSTEM

RELATED APPLICATION INFORMATION

This application claims benefit under 35 U.S.C. §119(e) of the filing date of provisional patent application Ser. No. 61/055,136, filed May 21, 2008, entitled APPARATUS AND METHOD FOR INTEGRAL THRUST VECTOR AND ROLL CONTROL.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to flight control systems for missiles, and particularly to missiles that incorporate thrust vectoring for attitude control.

2. Description of the Related Art

Missiles commonly include aerodynamic control surfaces such as fins, ailerons, rudders, flaps, canards, and other surfaces to control the attitude, or direction of travel, of the missile. However aerodynamic control surfaces may be ineffective at low velocities after missile launch, and may be ineffective at high altitudes at the upper extent or beyond the atmosphere. Thus missiles may also use thrust vectoring to control attitude at low speeds and/or high altitudes. In this context, thrust vectoring is defined as directing the thrust of a rocket motor or jet engine in a direction that is not parallel to a longitudinal axis of the missile.

Thrust vectoring is conventionally used to control pitch and yaw attitude, or elevation angle and azimuth angle. For example, thrust vectoring for large rocket motors may be accomplished by rotating the entire exhaust nozzle of the motor. For smaller rocket motors, thrust vectoring may be accomplished using rotatable devices, which may be aerodynamic vanes or fins, extending into the motor exhaust stream within or behind the motor nozzle. Since devices extending into the motor exhaust stream typically reduce the total thrust produced by the motor, thrust vectoring devices may be withdrawn from the exhaust stream when the missile has reach sufficient velocity to be control by aerodynamic control surfaces. However, thrust vectoring devices that can be both rotated and withdrawn in the environment of a rocket motor exhaust stream require complex actuation mechanisms.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
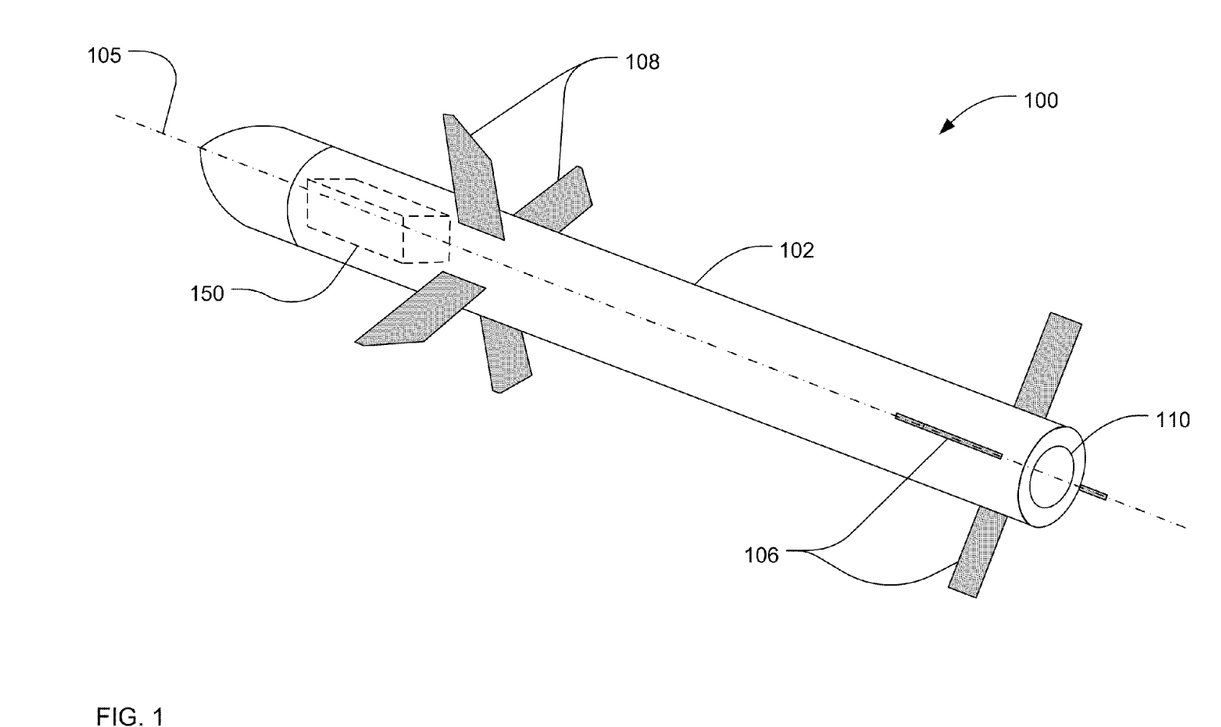
FIG. 1 is a perspective view of an exemplary missile.

Referring now to FIG. 1, an exemplary missile 100 may include a missile body 102, aerodynamic control surfaces 108, fins 106, and a propulsion system of which only nozzle 110 is visible in FIG. 1. The missile body may be rotationally symmetrical about a longitudinal axis 105. The propulsion system may be a rocket motor or jet engine which produces thrust by ejecting exhaust gases through the nozzle 110. In the example of FIG. 1, the control surfaces 108 are shown as canards, but may be fins, wings, ailerons, elevators, spoilers, flaps, air brakes or other controllable devices capable of affecting the flight path of the missile 100. The flight path of the missile 100 may also be control by vectoring the thrust produced through the nozzle 110.

The missile 100 may include a flight control system 150 within the missile body 102. The flight control system 150 may include one or more seekers, navigation systems, and communications systems, one or more processors, and a control actuation system, none of which are visible in FIG. 1. The processors may accept inputs from the seekers, navigation systems, and communications systems and determine necessary corrections to the missile flight path. The control actuation system may control the aerodynamic control surfaces 108 and/or thrust vectoring in response to commands from the processor.

Throughout this patent, words indicating direction (up, down, left, right, vertical, horizontal) angular orientation (elevation, azimuth), and angular direction (pitch and yaw) refer to the missile 100, or portions thereof, as shown in the drawings and do not imply any absolute orientation of the missile 100.

Figure 2:
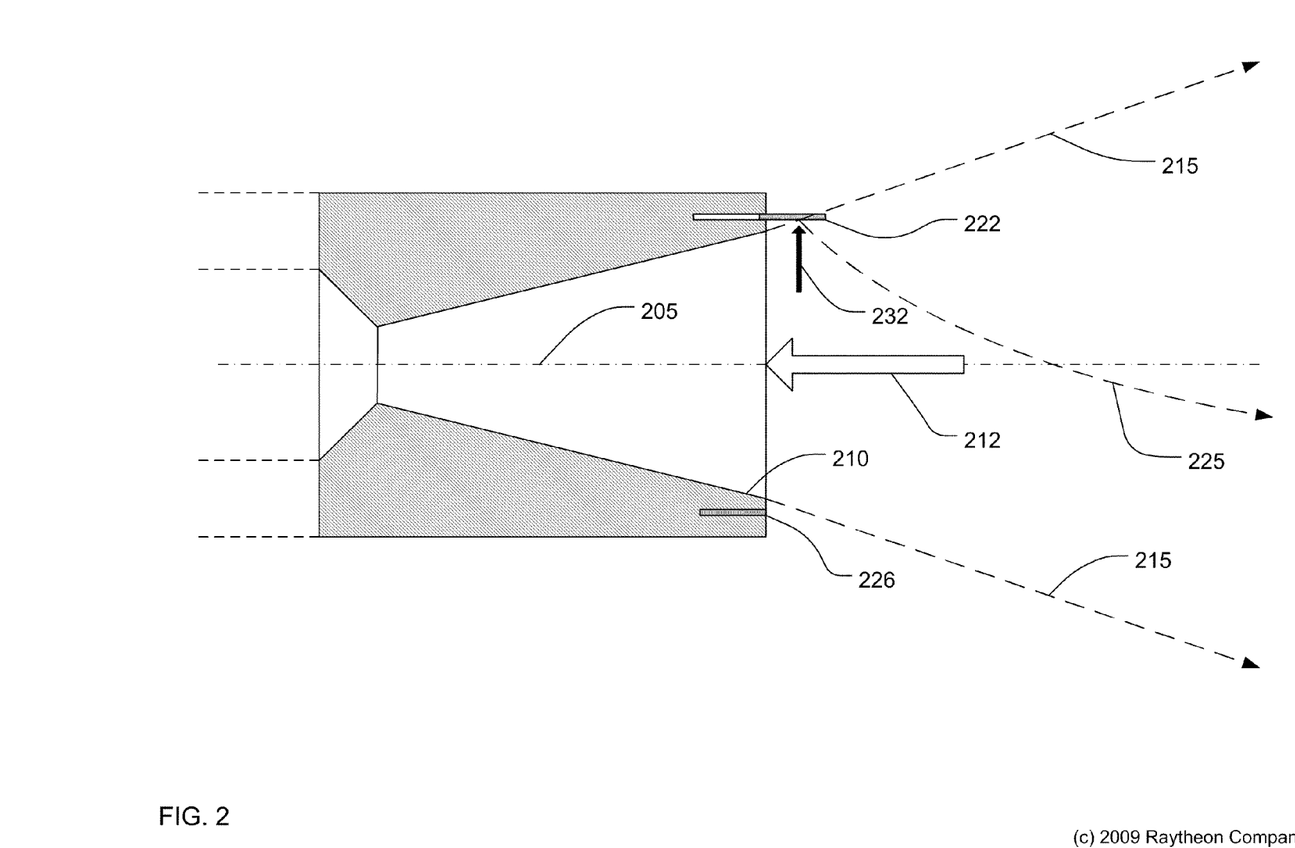
FIG. 2 is a side cross-sectional view of a rocket motor nozzle.

Referring now to FIG. 2, a missile may be powered by a motor that produces thrust, represented by arrow 212, along a longitudinal axis 205 by expelling combustion gases 215 through a nozzle 210. The arrow 212 indicates the direction of the force acting upon the missile, which is the opposite of the direction in which the combustion gases are expelled. Although the missile and the motor are not shown in FIG. 2, it may be understood that the missile and the motor extend to the left of the nozzle 210. When the flow of combustion gases 215 from the nozzle 210 is symmetrical about the longitudinal axis 205, the motor may only generate longitudinal thrust represented by arrow 212. A thrust deflector 222 may be a vane extended from the nozzle 210 to intercept and deflect a portion of the combustion gases as indicated by the arrow 225. In this application, the term "vane" is used with the normal meaning of "a flat or curved surface exposed to a flow of air, gas, or liquid so as to be impelled to move or to rotate".

Since the flow of combustion gases 215, 225 from the nozzle 210 is no longer symmetrical due to the presence of the thrust deflector 222, the thrust produced by the motor may have a component transverse to the axis 205, as represented by the arrow 232. Thus the thrust deflector 222 may be said to "generate" a force transverse to the longitudinal axis 205. However, it must be understood that the transverse force is produced by the flow of the combustion gases 215, 225 which is merely shaped by the thrust deflector 222.

The missile may include a plurality of thrust deflectors which may be independently extended or retracted to produce a transverse force in a desired direction. For example, the thrust deflector 222 is shown in a fully extended position and another thrust deflector 226 is shown in a retracted position. The retracted thrust deflector 226 may generate essentially no transverse force, where "essentially no" means zero or a level that has a negligible effect on the attitude of the missile.

Figure 3:
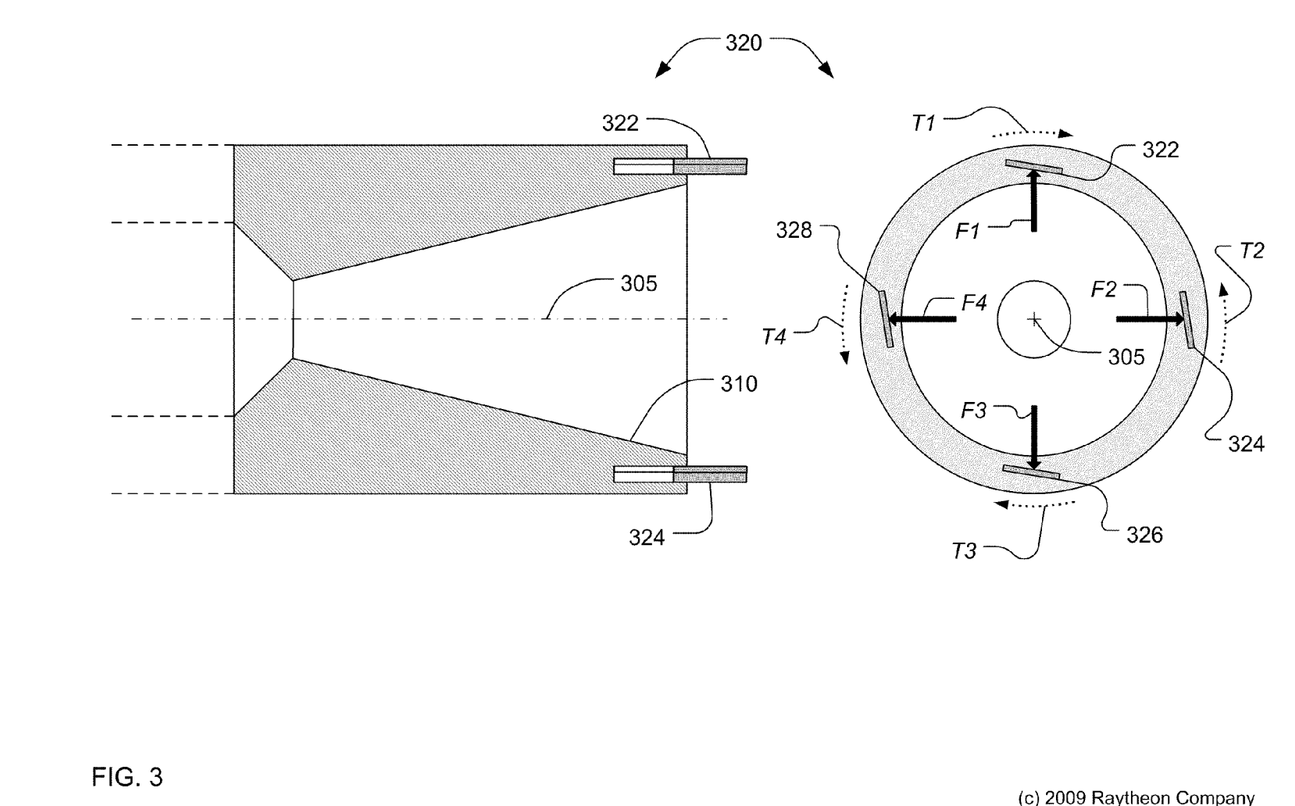
FIG. 3 is a side cross-sectional view and an end view of a rocket motor nozzle.

Referring now to FIG. 3, an integral thrust vector and roll control apparatus may include a first thrust deflector 322, a second thrust deflector 324, a third thrust deflector 326 and a fourth thrust deflector 328. The first, second, third, and fourth thrust deflectors 322, 324, 326, 328 may be disposed at 90-degree intervals around the perimeter of a nozzle 310. The first thrust deflector 322 and the third thrust deflector 326 may be diametrically opposed, and the second thrust deflector 324 and the fourth thrust deflector 328 may be diametrically opposed.

Each of the first, second, third, and fourth thrust deflectors 322, 324, 326, 328 may be a linearly-positionable, non-rotatable, vane that can be independently retracted or extended into the flow of combustion gases behind the nozzle 310. In this application, the coined term "linearly-positionable" means movable along a straight or nearly straight path.

Each thrust deflector 322, 324, 326, 328, when extended, may generate a corresponding force F1, F2, F3, F4 transverse to the longitudinal axis 305 of the nozzle 310. The longitudinal axis 305 may also be the longitudinal axis of a missile that is not shown in FIG. 3. The first thrust deflector 322 may generate a force F1 in a first direction and the second thrust deflector 324 may generate a force F2 in a second direction normal to the first direction. The third thrust deflector 326 may generate a force F3 in a third direction opposed to the first direction, and the fourth thrust deflection 328 may generate a force F4 is a further direction opposed to the second direction.

Each thrust deflector 322, 324, 326, 328 may be adapted to also generate, when extended, a torque urging the missile to roll about the longitudinal axis. In the example of FIG. 3, each thrust deflector 322, 324, 326, 328 is a flat vane permanently rotated to form an oblique angle with a radial line joining the longitudinal axis 305 to the center of the thrust deflector. Thrust deflector vanes may be curved, folded, or otherwise adapted to produce torque about the longitudinal axis. The first thrust deflector 322 and the third thrust deflector 326 may produce torque in a clockwise direction. The second thrust deflector 324 and the fourth thrust deflector 328 may produce torque in a counter-clockwise direction.

The net effect of the four thrust deflectors 322, 324, 326, 328 may be defined by the following equations:

$$Fy=F1-F3; \quad (1)$$

$$Fx=F2-F4; \quad (2)$$

$$Tn=T1+T3-T2-T4; \quad (3)$$

wherein: Fy=the net force acting on the nozzle in a vertical direction, with a positive value indicating an upward force, Fx=the net force acting on the nozzle in a horizontal direction, with a positive value indicating a force directed to the right, and Tn=the net torque, with a positive value indicating a net torque in the clockwise direction.

Figure 4:
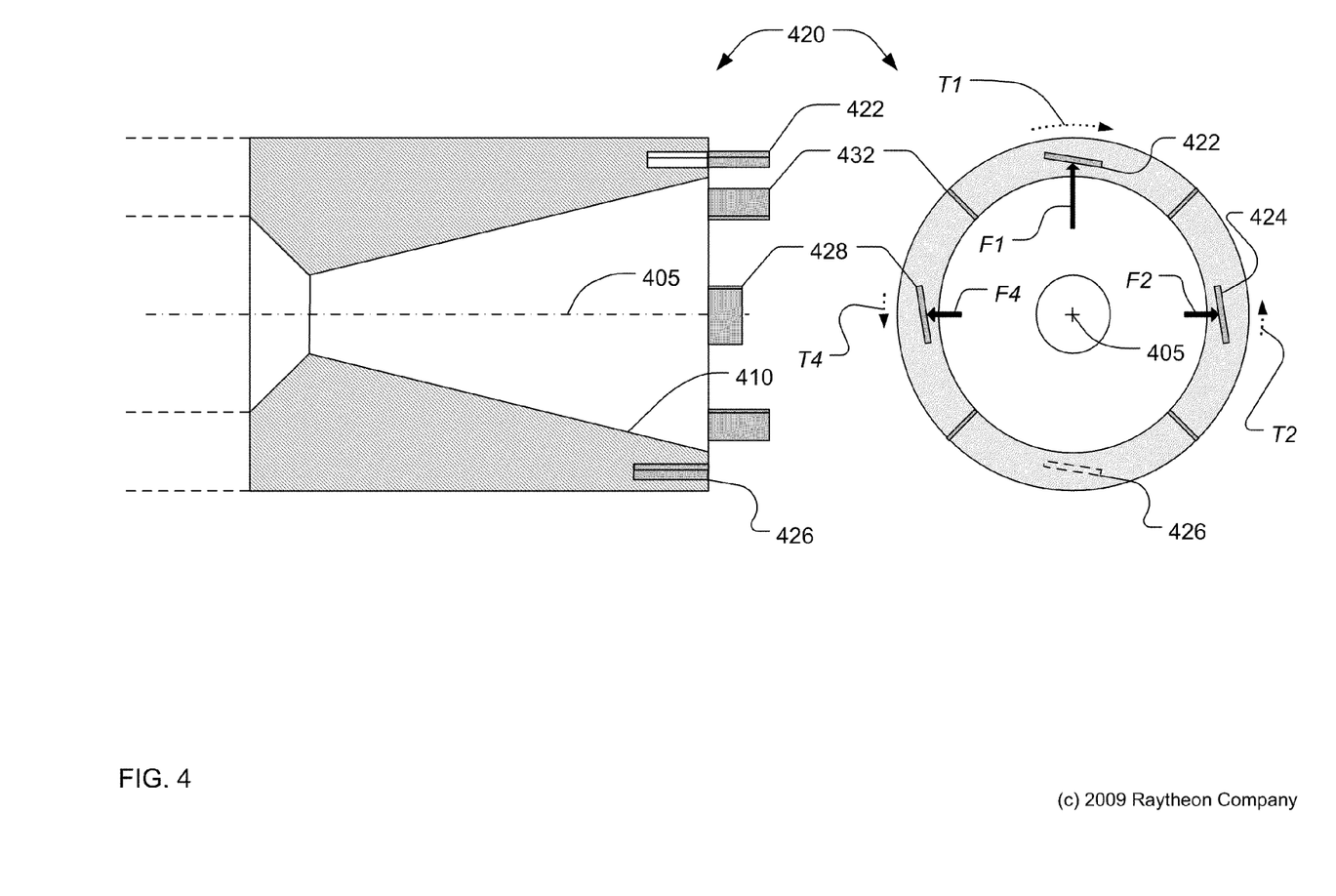
FIG. 4 is a side cross-sectional view and an end view of a rocket motor nozzle.

FIG. 4 shows an example of an integral thrust vector and roll control apparatus 420 used to generate a transverse thrust without generating any roll-inducing torque. A first thrust deflector 422 may be fully extended to produce a vertical transverse force F1 and a clockwise torque T1. A third thrust deflector 426 diametrically opposed to the first thrust deflector 422 may be retracted. Second and fourth thrust deflectors 424, 428 may be partially extended to produce equal and opposing horizontal transverse forces F3 and F4, and equal and additive counter-clockwise torques T3 and T4. The second and fourth thrust deflectors 424, 428 may be extended to an intermediate position between retracted and fully extended such that T2=T4=0.5(T1). In this case, the net torque given by equation (3) is equal to zero, and the net horizontal force given by equation (2) is equal to zero. Thus the net effect of the four thrust deflectors 422, 424, 426, 428 is the vertical transverse force F1.

In some applications, flow dams 432 may be disposed around the perimeter of the nozzle 410 to at least partially isolate the effects of each thrust deflector from the adjacent thrust deflectors. The flow dams 432 may be disposed, for example, at 90-degree intervals around the perimeter of the nozzle 410 mid-way between the four thrust deflectors 422, 424, 426, 428.

Figure 5:
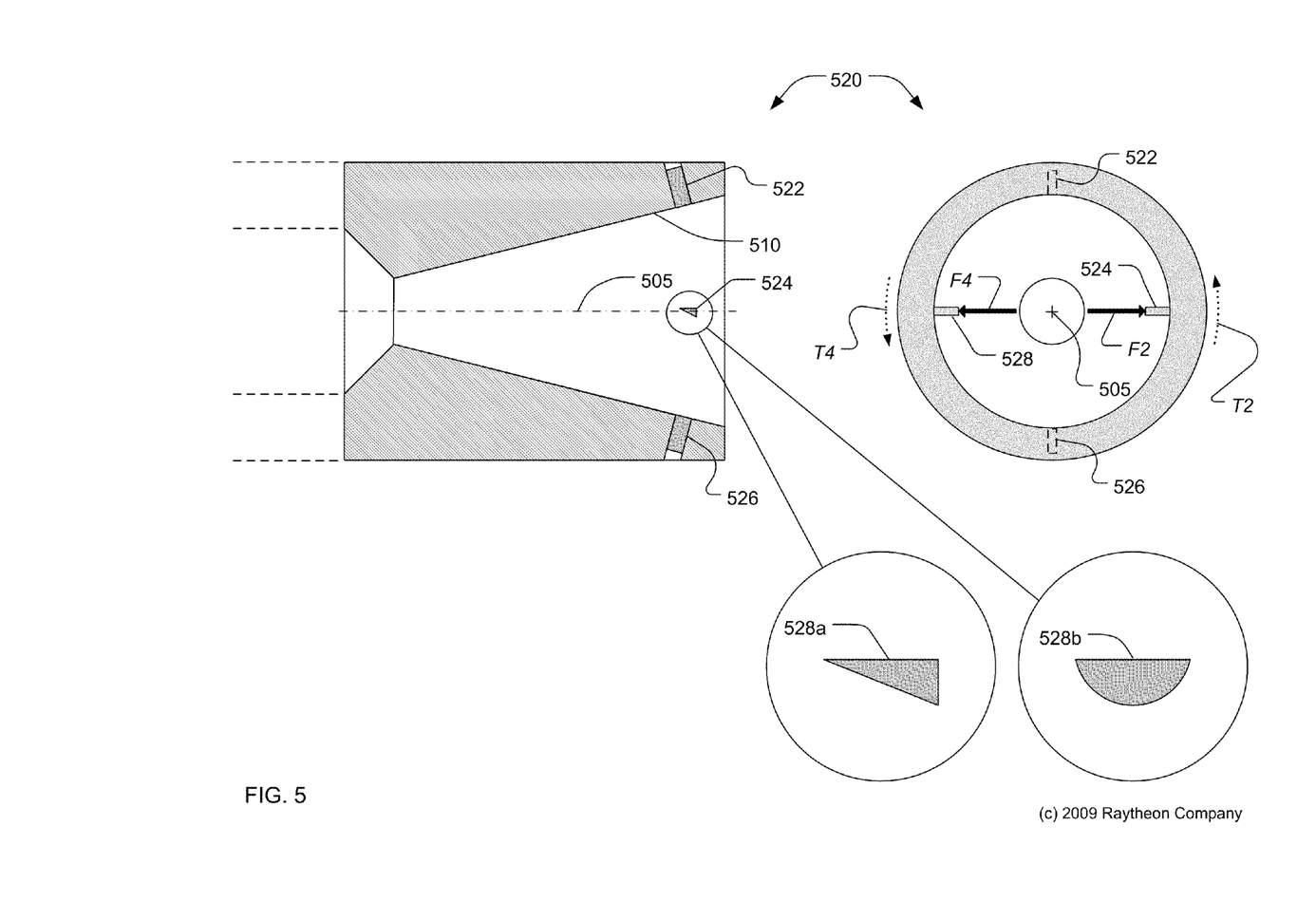
FIG. 5 is a side cross-sectional view and an end view of a rocket motor nozzle.

Referring now to FIG. 5, first, second, third, and fourth thrust deflectors 522, 524, 526, 528 may be linearly-positionable, non-rotatable, asymmetric pins that can be independently retracted or extended into the flow of combustion gases with a nozzle 510. As shown in the examples 528a and 528b, each asymmetric pin may be wedged or half-round. Each asymmetric pin may be any shape that, when extended, produces both a transverse force and a torque around the nozzle axis 505. Diametrically-opposed asymmetric pins may be oriented to produce torque in the same direction.

In the example of FIG. 5, the first thrust deflector 522 and the third thrust deflector 526 are retracted. The second thrust deflector 524 and the fourth thrust deflector 528 are extended to produce equal and opposing horizontal transverse forces F2 and F4 and additive counterclockwise torques T2 and T4. The example of FIG. 5 illustrates the use of thrust deflectors to produce a roll-inducing torque without any net transverse force.

Figure 6:
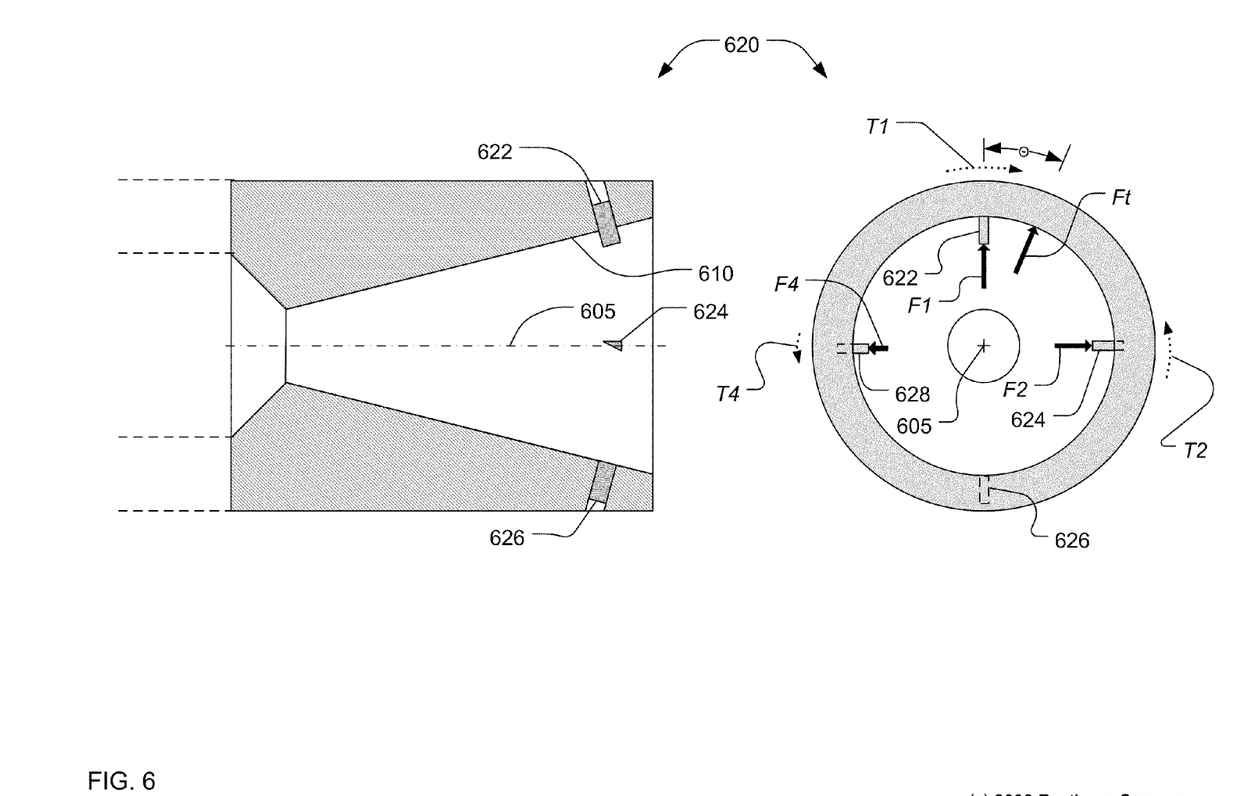
FIG. 6 is a side cross-sectional view and an end view of a rocket motor nozzle.

FIG. 6 shows another example of the use of asymmetric pins that can be independently extended into the flow of combustion gases with a nozzle 610. In FIG. 6, a first thrust deflector 622 may be fully extended into the nozzle 610 to produce vertical transverse force F1 and clockwise torque T1. A third thrust deflector 626 may be retracted. A second thrust deflector 624 and a fourth thrust deflector 628 are extended into the nozzle 610 by unequal amounts to produce opposing but unequal horizontal transverse forces F2 and F4 and additive counterclockwise torques T2 and T4.

The extension of the second thrust deflector 624 and the fourth thrust deflector 628 into the nozzle may be controlled to produce a counter-clockwise torque T2+T4 that exactly balances the clockwise torque T1 produced by the first thrust deflector 622. In this case, the net torque, as given by equation (3) is $$Tn=T1-T2-T4=0. \quad (4)$$

The extension of the second thrust deflector 624 and the fourth thrust deflector 628 into the nozzle may be further controlled to produce a non-zero horizontal transverse force F2–F4. The vector addition of the horizontal transverse force produced by the second and fourth thrust deflectors and the vertical transverse force produced by the first thrust deflector 622 may be a net tranverse force Fn directed at an angle Θ given by $$\Theta = \arctan[(F2-F4)/F1]. \quad (5)$$

Asymmetrical pins that can be extended into the airflow external to a missile may also be used to control attitude and roll.

While the examples of FIG. 3 to FIG. 6 included four thrust deflectors, an integral thrust vector and roll control apparatus may include more than four trust deflectors. An integral thrust vector and roll control apparatus may have a plurality of thrust deflectors including at least two thrust deflectors adapted to produce clockwise torque and at least two other thrust deflectors adapted to produce counter-clockwise torque.

Figure 7:
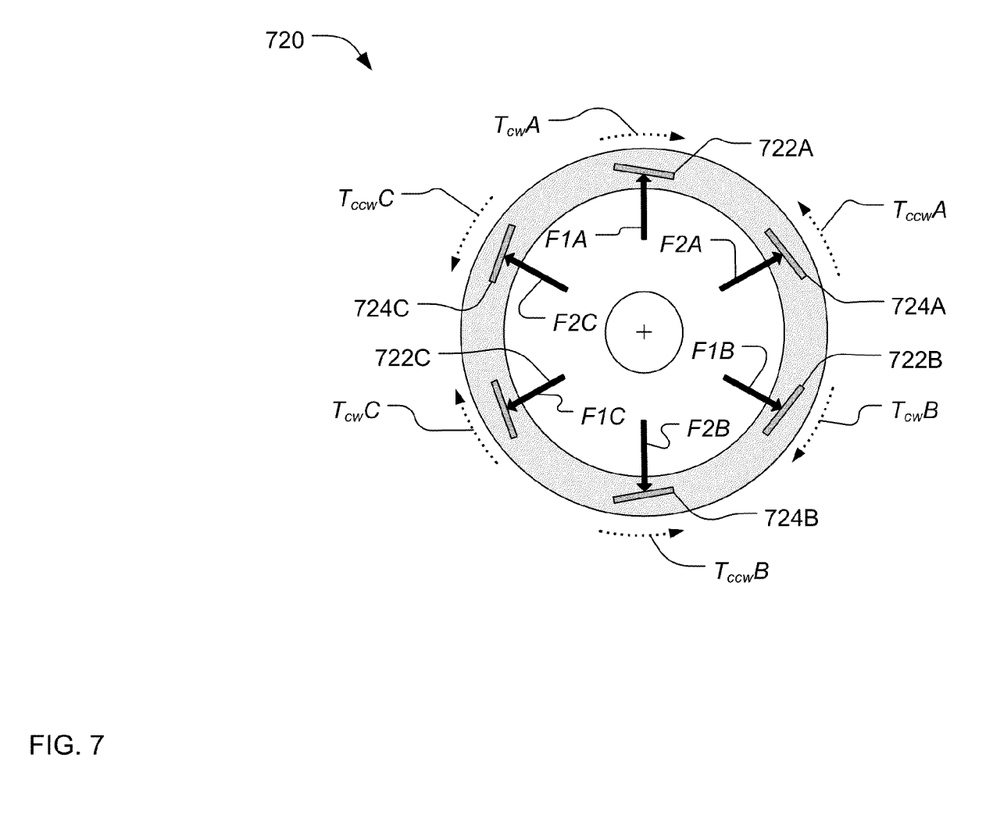
FIG. 7 is an end view of a rocket motor nozzle.

For further example, FIG. 7 shows an integral thrust vector and roll control apparatus including a first group of three independently-positionable non-rotatable thrust deflectors 722A, 722B, 722C adapted to produce clockwise torque when deployed and a second group of three independently-positionable non-rotatable thrust deflectors 724A, 724B, 724C that produce respective counter-clockwise torque when deployed. Each of the first group of thrust deflectors 722A, 722B, 722C may produce a corresponding position-dependent transverse force F1A, F1B, F1C and a corresponding position-dependent clockwise torque $T_{cw}A$, $T_{cw}B$, $T_{cw}C$. Each of the second group of thrust deflectors 724A, 724B, 724C may produce a corresponding position-dependent transverse force F2A, F2B, F2C and a corresponding position-dependent counter-clockwise torque $T_{ccw}A$, $T_{ccw}B$, $T_{ccw}C$.

The first group of thrust deflector 722A, 722B, 722C may be disposed around the perimeter of a rocket motor nozzle such that the thrust deflectors may be selectively deployed to produce, in combination, a transverse force in any desired direction. For example, as shown in FIG. 7, the first group of thrust deflectors 722A, 722B, 722C may be disposed at 120-degree intervals around the perimeter of the nozzle. The second group of thrust deflectors 724A, 724B, 724C may be also disposed at 120-degree intervals around the perimeter of the nozzle as shown in FIG. 7.

As an example of the use of a plurality of thrust deflectors to control the attitude of a missile without introducing any roll, one or more first group of thrust deflectors 722A, 722B, 722C may be deployed to produce a desired transverse force accompanied by a clockwise torque. All of the second group of thrust deflectors 724A, 724B, 724C may be deployed equally to produce a counter-clockwise torque to cancel the clockwise torque caused by the first thrust deflectors. The six thrust deflectors may be positioned in different combinations such that the vector sum of the transverse forces produced by the thrust deflectors equals a desired transverse force and the sum of the torques produce by the thrust deflectors equals a desired torque.

The number of thrust deflectors adapted to produce clockwise torque may be equal to or different from the number of thrust deflectors adapted to produce counter-clockwise torque. For example, a first group of three thrust deflectors may be adapted to produce clockwise torque and, when selectively deployed, a transverse force in any desired direction. A second group of two diametrically-opposed thrust deflectors could be used to provide counter-clockwise torque to cancel all or a portion of the torque generated by the first group of thrust deflectors.

Figure 8:
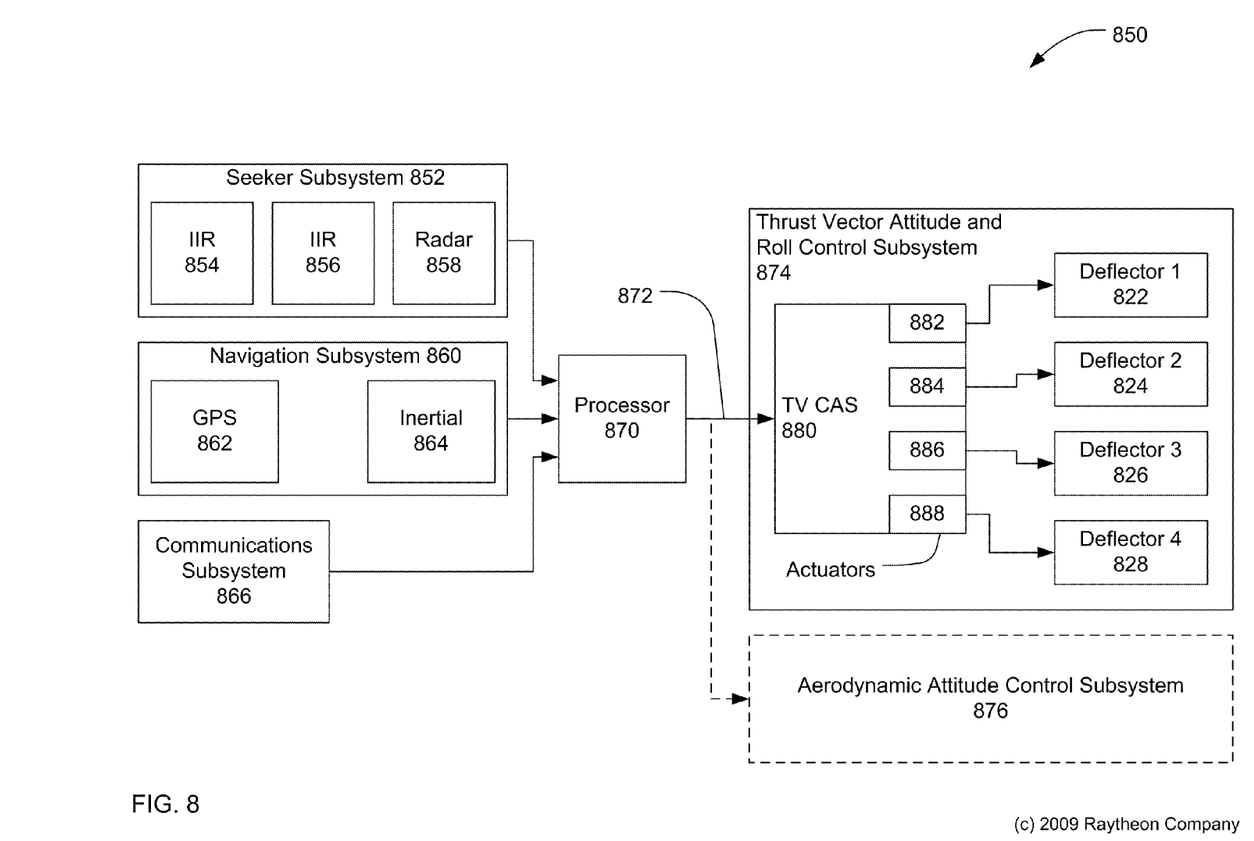
FIG. 8 is a block diagram of a missile flight control system.

Referring now to FIG. 8, a flight control system 850 for a missile, which may be the missile 100, may include a processor 870, a thrust vector attitude and roll control subsystem 874, and at least one of a seeker subsystem 852, a navigation subsystem 860, and a communications subsystem 866. The flight control system 850 may also include an aerodynamic attitude control subsystem 876 which may be used to control an attitude of the missile in combination with, or as an alternative to, the thrust vector attitude and roll control subsystem 880.

The seeker subsystem 852, if present, may contain one or more seekers such as, for example, a semi-active laser seeker 854, an imaging infrared (IIR) seeker 856 and/or a radar seeker 858. The seeker subsystem 852 may provide one or more guidance signals to the processor 870. The guidance signals provided by the seeker subsystem 852 may indicate the direction to a target being tracked by the seeker subsystem.

The navigation subsystem 860, if present, may contain one or more navigation systems such as, for example, a GPS navigation system 862 and/or an inertial navigation system 864. The navigation subsystem 860 may provide one or more guidance signals to the processor 870. The guidance signals provided by the navigation subsystem 860 may indicate the direction to a specific geographic destination.

The communications subsystem 866, if present, may contain a data link or other communication device to receive command and control information from a source external to the missile. The received command and control information may include one or more guidance signals which may be provided to the processor 870. The guidance signals provided by the communications subsystem 866 may indicate the direction to a target being tracked by a sensor, such as a radar system disposed on a vehicle that launched the missile for example, external to the missile.

The processor 870 may receive one or more guidance signals from at least one of the seeker subsystem 852, the navigation subsystem 860, and the communications subsystem 866. The processor may convert the guidance signals, through the application of control algorithms appropriate to the missile, into control signals 872 for the thrust vector subsystem 880. The processor may first convert the guidance signals into a required level of transverse force and required level of torque, and then convert the required level of transverse force and required level of torque into control signals. In cases where a missile includes an aerodynamic flight control subsystem 875, the processor 870 may convert the guidance signals into control signals 872 for one or both of the thrust vector subsystem 880 and the aerodynamic flight control subsystem 875. For example, the processor 870 may generate control signals 872 to control the missile flight using the thrust vector subsystem 880 when the missile velocity is below a predetermined value. The processor 870 may generate control signals 872 to control the missile flight using the aerodynamic flight control subsystem 875 when the missile velocity is above the predetermined value.

The thrust vector subsystem 874 may include a plurality of thrust deflectors and a thrust vector control actuation system 880. While the example of FIG. 8 shows four thrust deflectors 822, 824, 826, 828, a thrust vector subsystem may include more than four thrust deflectors. In the example of FIG. 8, the four thrust deflectors 822, 824, 826, 828 may be disposed at 90-degree intervals about the perimeter of a nozzle of a rocket motor that propels the missile.

Each of the four thrust deflectors 822, 824, 826, 828 may be linearly-positionable and non-rotatable. Each of the four thrust deflectors 822, 824, 826, 828 may be independently positionable, which is to say the each of the four thrust deflectors 822, 824, 826, 828 may be extended or retracted independent of the position of the other three deflectors.

Each of the four thrust deflectors 822, 824, 826, 828, when extended, may produce a transverse force in a direction normal to an axis of the missile. Specifically, each of the four thrust deflectors 822, 824, 826, 828 may produce a transverse force acting along a radial line connecting an effective center of the thrust deflector to an axis of the missile. Diametrically-opposed deflectors may be adapted to produce force in opposing directions. Each of the four thrust deflectors 822, 824, 826, 828 may, when extended, also result in circumferential torque urging the missile to roll in a predetermined direction. One pair of diametrically-opposed deflectors may, when extended, urge the missile to roll in a clockwise direction and the other pair of diametrically-opposed deflectors may, when extended, urge the missile to roll in a counter-clockwise direction.

The level of force and torque produce by each thrust deflector 822, 824, 826, 828 may vary as a function of the thrust deflector position. Each of the thrust deflectors 822, 824, 826, 828 may produce essentially no force and essentially no torque when retracted. In this context, the phrase "essentially no" means "no more than a negligible amount". Each of the thrust deflectors 822, 824, 826, 828 may cause essentially no reduction in the thrust or efficiency of the associate rocket motor when retracted. Each of the thrust deflectors 822, 824, 826, 828 may be positionable to a fully extended position that produces a first torque level and to at least one intermediate position that produces a second torque level equal to one-half of the first torque level.

The four thrust deflectors 822, 824, 826, 828 may be vanes as shown in FIG. 3 (322, 324) and FIG. 4 (422, 426, 428). The four thrust deflectors 822, 824, 826, 828 may be asymmetrical pins as shown in FIG. 5 (522, 524, 526, 528). The four thrust deflectors 822, 824, 826, 828 may be other deployable structures that cause the described radial force and circumferential torque when deployed.

The thrust vector control actuation system 880 may include four actuators 882, 884, 886, 888 for translating control signals 872 received from the processor 870 into corresponding motions of the respective thrust deflectors 822, 824, 826, 828. A thrust vector subsystem 874 with more than four thrust deflectors would have a corresponding number of actuators. In this patent, the term "actuator" refers to a combination of mechanical, electrical, and electromechanical components including at least one component movable with respect to other components and a transducer that converts an electrical signal into a motion of the movable component. The transducer may be a linear or rotary motor, a linear or rotary solenoid, or some other device to convert an electric signal into a mechanical motion. The mechanical motion produced by the transducer may be linear, rotary, a combination of linear and rotary, or some other movement. Each actuator may be mechanically coupled to the corresponding thrust deflector by a pushrod, a rack, a cam, a crank, rotary or linear slides, links, cables, bearings, bushings, or other devices and combinations thereof. Each transducer may be separated and thermally isolated from the corresponding thrust deflector such that the transducer is not exposed to the extreme temperatures of the motor combustion gases.

Description of Processes

Figure 9:
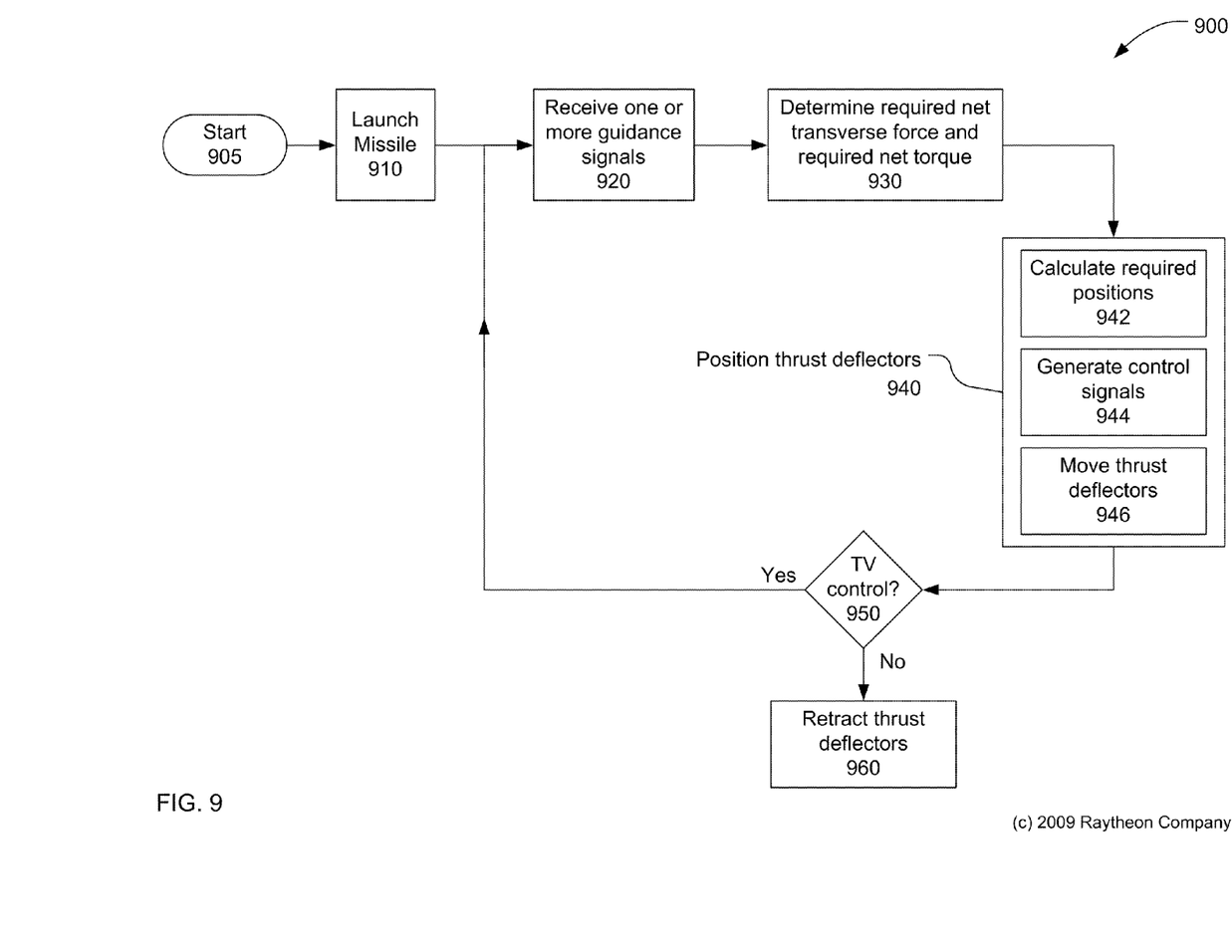
FIG. 9 is a flow chart of a process for controlling the attitude and roll of a missile.

Referring now to FIG. 9, a method 900 of controlling the attitude and roll of a missile may start at 905, which may be, for example, the acquisition of a target leading to a decision to launch the missile at 910. After missile launch, the speed of the missile may be insufficient to control the attitude of the missile with aerodynamic control surfaces. Thus the attitude, including roll, or the missile may be controlled by thrust vectoring using thrust deflectors.

At 920, one or more guidance signals may be received from at least one of a sensor subsystem, a navigation subsystem, and a communications subsystem within the missile. For example, the missile may include one or more sensors to track an intended target, a GPS receiver to determine the present position of the missile and an inertial measurement unit to measure the attitude of the missile.

At 930, a desired change in the attitude of the missile may be derived from the guidance signals and a net transverse force and a net torque required to cause the desired change may be determined. The required net transverse force and the required torque may be determined by processing the one or more guidance signal using control algorithms appropriate to the missile.

At 940, a plurality of non-rotatable thrust deflectors may be positioned to collectively provide the required net transverse force and the required net torque. The thrust deflectors may be disposed at equal or unequal intervals about the nozzle of the rocket motor. Each of the thrust deflectors may produce, as a function of linear position, both transverse force and torque. At least two thrust deflectors may be adapted to produce clockwise torque and at least two other thrust deflectors may be adapted to produce counter-clockwise torque. The thrust deflectors may be positioned such that the sum of the torques produced by the thrust deflectors is equal to the required net torque and the vector sum of the transverse forces produced by the thrust deflectors is equal to the required transverse force.

Positioning the thrust deflectors at 940 may include, at 942, calculating a required position for each thrust deflector based on the required net transverse force and the required net torque. At 944, electrical control signals may be generated from the required positions of the thrust deflectors. At 946, actuators coupled to each of the thrust deflectors may move each thrust deflector to the respective required position in response to the respective control signal.

At 950, a determination may be made if the missile will continue to use thrust vector (TV) control, in which case the process 900 may continue from 920. When a determination is made at 950 that thrust vector will not be used, possibly because the missile speed is sufficient to use only aerodynamic control, the thrust deflectors may be retracted at 960.

While the actions at 920, 930, 940, and 950 are shown in FIG. 2 as sequential steps for ease of explanation, it may be understood that these actions collectively constitute a closed loop control system. Thus the actions at 920, 930, 940, and 950 may be performed continuously and essentially simultaneously in real-time. In this context, "real-time" may be defined as having a delay, from the receipt of guidance signals at 920 to the consequential motion of the thrust deflectors at 946, short enough to maintain stable control of the missile attitude.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An apparatus for vectoring the thrust of a motor that produces thrust along a longitudinal axis by expelling combustion gases through a nozzle, comprising:
    a plurality of linearly-positionable non-rotatable thrust deflectors disposed around a perimeter of the nozzle,
    wherein each thrust deflector is independently positionable to simultaneously generate both a transverse force normal to the longitudinal axis and a torque about the longitudinal axis; and
    wherein, for each of the thrust deflectors, the thrust deflector is disposed in a cavity in the apparatus in a retracted position, and is movable outward from the cavity to a fully extended position.

2. The apparatus of claim 1, the plurality of thrust deflectors comprising:
    at least two thrust deflectors adapted to produce torque in a clockwise direction; and
    at least two thrust deflectors adapted to produce torque in a counter-clockwise direction.

3. The apparatus of claim 2, the plurality of thrust deflectors consisting of:
    first, second, third, and fourth thrust deflectors disposed at 90-degree intervals around the perimeter of the nozzle, the third thrust deflector diametrically opposed to the first thrust deflector, wherein
    the first and third thrust deflectors adapted to generate torque in a clockwise direction, and
    the second and fourth thrust deflectors adapted to generate torque in a counter-clockwise direction.

4. The apparatus of claim 3, wherein
    the first thrust deflector, when extended, generates a force in a first direction and the third thrust deflector, when extended, generates a force in a third direction opposed to the first direction
    the second thrust deflector, when extended, generates a force in a second direction normal to the first direction and the fourth thrust deflector, when extended, generates a force in a fourth direction opposed to the second direction.

5. The apparatus of claim 2, the plurality of thrust deflectors comprising:
    first, second, third, fourth, fifth, and sixth thrust deflectors disposed in sequence at 60-degree intervals around the perimeter of the nozzle, wherein
    the first, third, and fifth thrust deflectors generate torque in a clockwise direction, and
    the second, fourth and sixth thrust deflectors generate torque in a counter-clockwise direction.

6. The apparatus of claim 1, wherein each of the plurality of thrust deflectors is linearly movable moved between
    the retracted position,
    the fully extended position, and
    at least one intermediate extended position.

7. The apparatus of claim 6, wherein, in the retracted position, each thrust deflector generates substantially no force and substantially no torque and has substantially no effect on the thrust and efficiency of the motor.

8. The apparatus of claim 6, further comprising: a control actuation system to independently position each of the plurality of thrust deflectors.

9. The apparatus of claim 8, the control actuation system further comprising: a plurality of actuators mechanically coupled to the plurality of thrust deflectors, each of the plurality of actuators effective to position a respective thrust deflector in response to control signals.

10. The apparatus of claim 9, further comprising:
    at least one of a seeker subsystem, a navigation subsystem, and a communications subsystem to provide one or more guidance signals
    a processor to provide the control signals to the plurality of actuators based on the one or more guidance signals.

11. The apparatus of claim 1, wherein the thrust deflectors are vanes extendable rearwardly behind the nozzle.

12. The apparatus of claim 11, further comprising a plurality of flow dams disposed around the perimeter of the nozzle.

13. The apparatus of claim 12, wherein the flow dams at least partially isolate the effects of each thrust deflector from adjacent thrust deflectors.

14. The apparatus of claim 13, wherein the flow dams extend away from the longitudinal axis in radial directions.

15. The apparatus of claim 1, wherein the thrust deflectors are asymmetric pins extendable into the nozzle.

16. The apparatus of claim 1, wherein each thruster deflector is extendable in a rearward direction that is parallel to the longitudinal axis.

17. The apparatus of claim 1, wherein the thrust deflector is extendable in a rearward direction at an acute angle relative to the longitudinal axis.

18. The apparatus of claim 1, the plurality of thrust deflectors comprising:

at least two thrust deflectors angled relative to the longitudinal axis to produce torque in a clockwise direction; and at least two thrust deflectors angled relative to the longitudinal axis produce torque in a counter-clockwise direction.

19. An apparatus for vectoring the thrust of a motor that produces thrust in a first rearward direction along a longitudinal axis by expelling combustion gases through a nozzle, comprising:

a plurality of cavities within the nozzle; and a plurality of thrust deflectors linearly coupled to the plurality of cavities, to allow sliding and prevent rotation, of the plurality thrust deflectors relative to the plurality of cavities;

wherein at least one of the plurality of thrust deflectors is configured to linearly actuate within the nozzle; and wherein the plurality of cavities prevent rotation of the plurality of thrust deflectors.

* * * * *